(12) United States Patent
Arya et al.

(10) Patent No.: US 11,707,833 B1
(45) Date of Patent: Jul. 25, 2023

(54) ROBOTIC ARM DEVICE

(71) Applicant: HIWIN TECHNOLOGIES CORP., Taichung (TW)

(72) Inventors: Made Rama Pradipta Arya, Taichung (TW); Jian-An Lin, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 17/570,890

(22) Filed: Jan. 7, 2022

(51) Int. Cl.
B25J 9/00 (2006.01)

(52) U.S. Cl.
CPC .................... B25J 9/0009 (2013.01)

(58) Field of Classification Search
CPC .... B25J 19/0025; B25J 19/0009; H02G 11/00
USPC ........................................ 74/490.02
See application file for complete search history.

(56) References Cited

U.S. PATENT DOCUMENTS

| 6,431,018 | B1* | 8/2002 | Okada | B25J 19/0025 74/490.02 |
|---|---|---|---|---|
| 8,117,939 | B2 | 2/2012 | Burlot | |
| 9,289,902 | B2* | 3/2016 | Groß | A61B 6/4458 |
| 9,399,299 | B2 | 7/2016 | Hermey et al. | |
| 10,989,282 | B1* | 4/2021 | Hoffman | F16H 19/0672 |
| 2001/0032973 | A1* | 10/2001 | Karlinger | B25J 19/0025 254/394 |
| 2008/0056859 | A1* | 3/2008 | Inoue | B25J 19/0029 901/30 |
| 2008/0164382 | A1* | 7/2008 | Burlot | H02G 11/00 901/50 |
| 2009/0166478 | A1* | 7/2009 | Choi | B25J 19/0025 248/51 |
| 2009/0255711 | A1* | 10/2009 | Choi | B25J 19/0025 174/135 |
| 2015/0328780 | A1* | 11/2015 | Burlot | B25J 19/0025 74/490.02 |
| 2017/0259432 | A1* | 9/2017 | Goerbing | B41J 2/175 |
| 2019/0105787 | A1* | 4/2019 | Kapczynski | F16L 3/18 |

FOREIGN PATENT DOCUMENTS

| CN | 107771120 A | | 3/2018 | |
|---|---|---|---|---|
| DE | 19916706 A1 | * | 10/2000 | ......... B25J 19/0025 |
| DE | 102007007829 A1 | * | 8/2008 | ......... B25J 19/0025 |
| DE | 202015002063 U1 | * | 7/2015 | ......... B25J 19/0025 |
| DE | 102015226066 A1 | * | 6/2017 | ......... B25J 19/0025 |
| EP | 1163986 A2 | * | 12/2001 | ......... B25J 19/0025 |
| EP | 1743748 A1 | * | 1/2007 | ......... B25J 19/0025 |
| EP | 2913162 A2 | * | 9/2015 | ......... B25J 19/0025 |
| FR | 2664441 A1 | * | 7/1990 | |
| FR | 3001175 A1 | * | 7/2014 | ......... B25J 19/0025 |

(Continued)

Primary Examiner — T. Scott Fix
(74) Attorney, Agent, or Firm — Muncy, Geissler, Olds & Lowe, P.C.

(57) ABSTRACT

A robotic arm device includes a robotic arm including a base, a first arm and a second arm, a wire set adjacent to the first arm and the second arm, and a wire take-up module set in the first arm and including a rail, a sliding block and an elastic member. The sliding block is vertically slidably set on the rail and connected with the wire set and the elastic member. With the configuration of the wire take-up module, the robotic arm device can achieve the effects of improving wiring convenience, reducing wiring interference and saving wiring time.

4 Claims, 12 Drawing Sheets

(56) References Cited

FOREIGN PATENT DOCUMENTS

| JP | 1984-007598 A | 1/1984 | | |
|---|---|---|---|---|
| JP | 1990-198781 A | 8/1990 | | |
| JP | 1990-269593 A | 11/1990 | | |
| JP | 1999-028691 A | 2/1999 | | |
| JP | 2012-161903 A | 8/2012 | | |
| JP | 2012161903 A | * 8/2012 | ........... | B23K 11/115 |
| WO | WO-2011025081 A1 | * 3/2011 | .......... | B25J 19/0025 |
| WO | WO-2018143055 A1 | * 8/2018 | ............. | B23K 31/02 |

* cited by examiner

ROBOTIC ARM DEVICE

BACKGROUND OF THE INVENTION

1. Field of the Invention

The present invention relates to robotic arm technology and more particularly, to a robotic arm device that can improve the convenience of wiring.

2. Description of the Related Art

The development and application of multi-axis robotic arms is of great help in saving manpower, replacing manpower into dangerous working environments, and improving the quality of precision machining. Since the multi-axis robot arm presents a fast and highly complex operation mode, a length of wiring needs to be reserved to prevent the line from being damaged due to excessive pulling. However, this also causes the space requirement of the robotic arm to increase during operation, and the excessively long line is also prone to entanglement or interference with surrounding objects.

The cable chain retraction system disclosed in the U.S. Pat. No. 10,989,282 has a guide wheel and a set of constant force spring cartridges. When the action angle of the robotic arm pulls the cable, the guide wheel will be pushed by the cable and move forward along the guide rail. When the guide wheel moves forward, it will resist the elastic force provided by constant force spring cartridges at the same time. On the contrary, when the operating angle of the robotic arm loosens the cable, the elastic force provided by the constant force spring cartridges will drive the guide wheel to move backward, so that the guide wheel will tighten the slack cable at the same time during the backward process.

The guide system disclosed in the U.S. Pat. No. 9,399,299 has a base and a carrier member configured with supply lines. The carrier member can move between the deflection position and the return position. The guide system has a return device for returning the carrier member to the return position. When the operating angle of the robotic arm pulls the carrier member, the direction-changing element will be pushed by the carrier member and move forward along the guide rail. When the carrier member moves forward, it will resist the return force provided by the return device at the same time. Conversely, when the action angle of the robotic arm releases the carrier member, the return force provided by the return device will drive the carrier member back to the return position.

However, both of the aforementioned two patent documents have the problem of large volume and high cost. Because of the large size, it may limit the range of motion of the robotic arm and reduce the moment of inertia of the robotic arm, so there is still room for improvement in the structure.

SUMMARY OF THE INVENTION

The present invention has been accomplished under the circumstances in view. It is the main object of the present invention to provide a robotic arm device, which can improve wiring convenience and reduce wiring interference, and save operating space.

In order to achieve the above main object, the robotic arm device of the present invention comprises a robotic arm, a wire set, and a wire take-up module. The robotic arm comprises a base, a first arm and a second arm. The wire set is adjacent to the first arm of the robotic arm and the second arm of the robotic arm. The wire set has one end thereof fixed to the second arm of the robotic arm. The wire take-up module is located in the first arm of the robotic arm, comprising a rail, a sliding block and an elastic member. The sliding block is vertically movably set on the rail and connected with the wire set and the elastic member.

It can be seen from the above that the wire set will be pulled or loosened according to the actuation angle of the robotic arm. When the robotic arm pulls the wire set, the wire set moves upward along the rail through the sliding block, and at the same time accumulates the elastic restoring force of the elastic member. Conversely, when the robotic arm releases the wire set, the elastic restoring force generated by the elastic member will drive the sliding block to move down and pull the wire set to return to its original position. In other words, with the automatic wire take-up function provided by the wire take-up module, the wire set can be close to the robotic arm during the process of being pulled or loosened. In addition to avoiding the wire set from interfering with surrounding objects, it can also save the space required by the robotic arm during operation, thereby improving the convenience of wiring.

Preferably, the wire set has a cable and a wiring conduit covering the cable. One end of the wiring conduit is fixed to the base of the robotic arm, and the other end of the wiring conduit is fixed to the front end of the second arm of the robotic arm.

Preferably, the robotic arm also has a first joint seat and a second joint seat. The first joint seat is pivoted at the top of the base. The bottom of the first arm is pivoted to the first joint seat. The second joint seat is pivoted at the top of the first arm. The rear end of the second arm is pivoted to the second joint seat.

Preferably, the wire take-up module also has a protective cover and a conduit fixing member. The protective cover is set on the first arm of the robotic arm. The rail is located in the protective cover. The conduit fixing member connects the sliding block and the wiring conduit. The top and bottom ends of the elastic member are respectively fixed to the conduit fixing member and the protective cover.

Preferably, the conduit fixing member has a positioning plate and a ring buckle. The positioning plate connects the sliding block and the top of the elastic member. The ring buckle is set on the positioning plate and fixes the wiring conduit. In this way, the wire holder drives the wiring conduit to move up and down through the ring buckle.

Preferably, the positioning plate has a first positioning portion, a second positioning portion and a third positioning portion. The second positioning portion and the third positioning portion vertically connect the two opposite sides of the first positioning portion. The first positioning portion connects the sliding block. The second positioning portion connects the ring buckle. The third positioning portion is connected to the top of the elastic member. The length of the third positioning portion is greater than the length of the sliding block. This can shorten the invalid stroke of the elastic member.

Preferably, the bottom end of the first arm pivots around a first rotation center relative to the first joint seat. The second joint seat pivots around a second rotation center relative to the first arm. The line formed by the shortest distance between the first rotation center and the second rotation center is parallel to the motion trajectory of the sliding block. With the above technical features, the operating stability of the sliding block can be improved.

Preferably, one end of the wiring conduit is fixed to a conduit fixation head, the conduit fixation head is rotatably set to a holder, the holder is connected to an end connecting seat, the end connecting seat is pivoted to a third joint seat, and the third joint seat is pivoted at the front end of the second arm. With the rotatable design of the conduit fixation head, the wiring conduit can be prevented from being damaged by force and twisting during the operation of the second arm.

Preferably, the rail is fixed to a rail fixing seat, and the rail fixing seat is fixed to the protective cover. In this way, the wire take-up module can be completely removed from the robotic arm to achieve a modular effect.

Preferably, the rail is fixed to a rail fixing seat, and the rail fixing seat is fixed to the first arm of the robotic arm, so that the rail fixing seat and the first arm form an integrated structure to improve the structure strength.

Preferably, the wire take-up module further has two baffles and two guide wheels. One of the baffles is fixed on the top of the protective cover. The guide wheels are detachably set between the baffles and allows the wiring conduit to pass between the guide wheels. In this way, on the one hand, the wiring conduit is provided with guiding and limiting effects, on the other hand, by disassembling the guide wheels, the wiring conduit can be easily removed and replaced.

Preferably, the tensile force of the elastic member is between 0.8 kg-1.3 kg in this embodiment. If it is less than 0.8 kg, when the robotic arm moves quickly, the recycling of the wiring conduit will not be fast enough, which will affect the subsequent retracting. If it is higher than 1.3 kg, it is easy to cause the load of the motor to rise, resulting in damage to the wiring conduit and the cable inside.

Preferably, the stroke of the sliding block is between 320 mm-400 mm, which can correspond to the action of the robotic arm in multi-axis rotation angles.

The detailed structure, features, assembly or use of the robotic arm device provided by the present invention will be described in the detailed description of the subsequent implementation. However, those with ordinary knowledge in the field of the present invention should be able to understand that these detailed descriptions and specific embodiments listed in the implementation of the present invention are only used to illustrate the present invention, and are not intended to limit the scope of the patent application of the present invention.

DETAILED DESCRIPTION OF THE INVENTION

Figure 1:
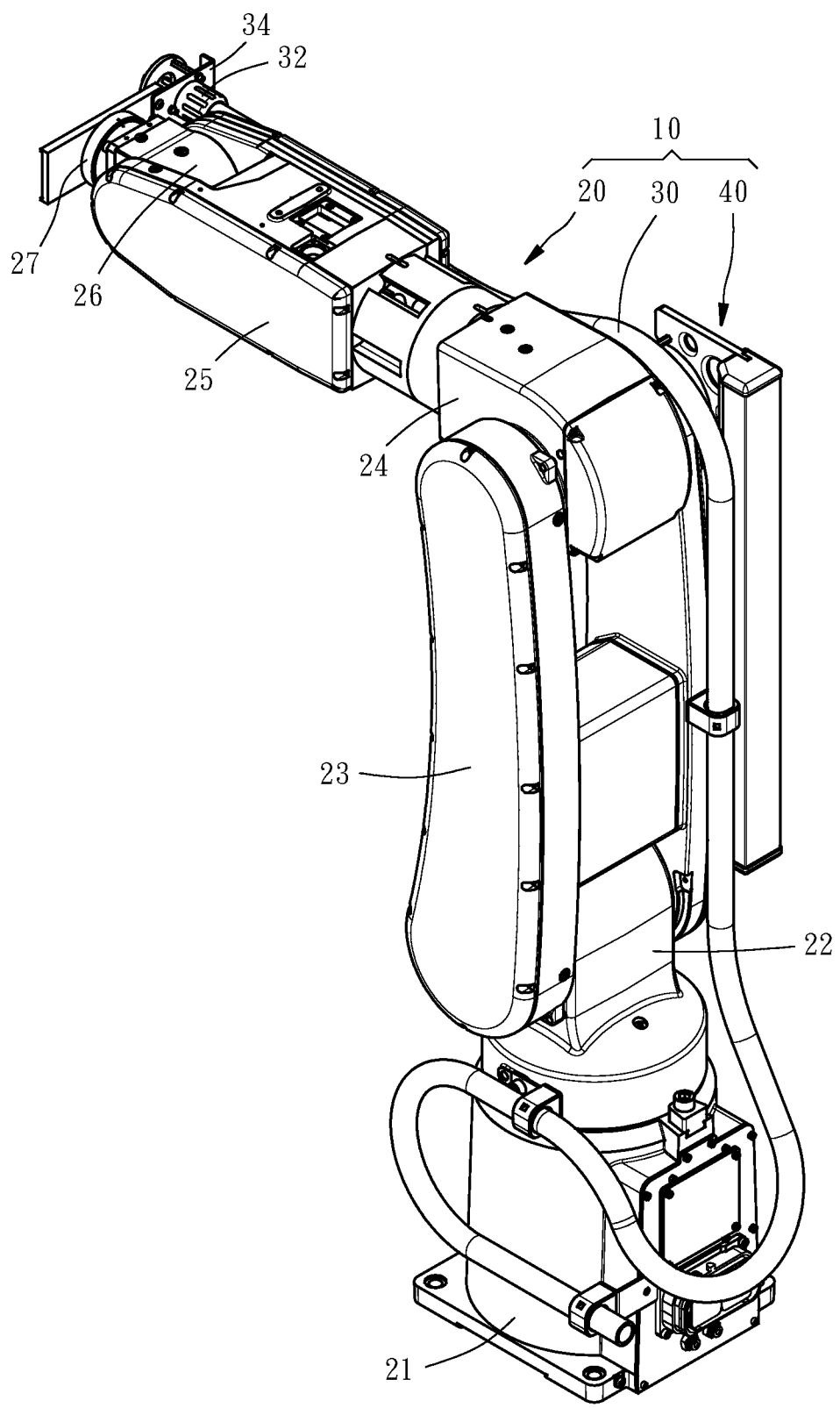
FIG. 1 is an oblique top elevational view of a robotic arm device in accordance with a first embodiment of the present invention.
Figure 2:
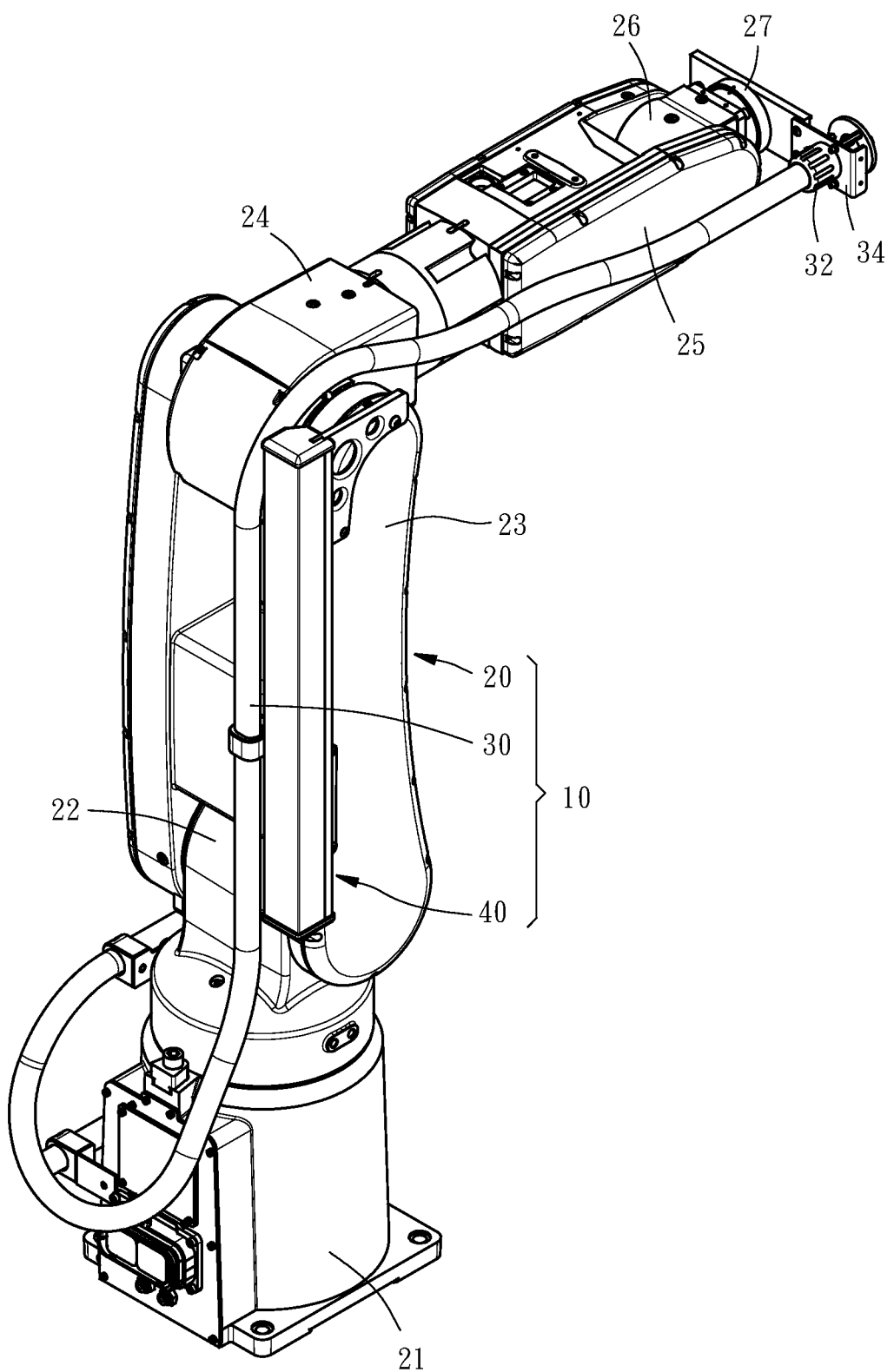
FIG. 2 corresponds to FIG. 1 when viewed from another angle.

The applicant first explains here that throughout the specification, including the embodiments described below and the claims in the scope of the patent application, the nouns related to directionality are based on the directions in the drawings. Secondly, in the embodiments and drawings that will be introduced below, the same element numbers represent the same or similar elements or their structural features.

Please refer to FIG. 1, the robotic arm device 10 of the first embodiment of the present invention includes a robotic arm 20, a wire set and a wire take-up module 40.

The robotic arm 20 is a six-axis robotic arm in this embodiment, but it is not limited to this. The robotic arm 20 comprises a base 21, a first joint seat 22, a first arm 23, a second joint seat 24, a second arm 25, a third joint seat 26 and an end connecting seat 27. The first joint seat 22 is pivoted on the top of the base 21 in a rotatable manner. The bottom end of the first arm 23 is mounted on the first joint seat 22 in a manner that can pivot up and down. The second joint seat 24 is mounted on the top of the first arm 23 in a manner that can pivot up and down. The rear end of the second arm 25 is mounted on the second joint seat 24 in a rotatable manner. The third joint seat 26 is installed at the front end of the second arm 25 in a manner that can pivot up and down. The end connecting seat 27 is pivoted to the third joint seat 26 in a rotatable manner.

The wire set comprises a cable (not shown) and a wiring conduit 30 covering the cable therein. The aforementioned cable can be (but not limited to) power cables for transmitting power, signal cables for transmitting signals, or a combination of power cables and signal cables. In terms of material, the wiring conduit 30 is mainly made of stretchable flexible pipes, such as plastic wave pipes. One end of the wiring conduit 30 is fixed to the base 21 of the robotic arm 20, and then the wiring conduit is folded 180 degrees and fixed to the first joint seat 22 of the robotic arm 20, and then the wiring conduit is extended upward along the back side of the first arm 23 of the robotic arm 20 and then extended forward along the right side of the second arm 25 of the robotic arm 20, and finally, the other end of the wiring conduit is connected to a conduit fixation head 32 that can rotate in place. The conduit fixation head 32 is fixed to a holder 34, and one end of the holder 34 is locked to the end connecting seat 27. It is worth mentioning that a tie can also be used to replace the wiring conduit 30, as long as the structure of the cable can be fixed.

Figure 4:
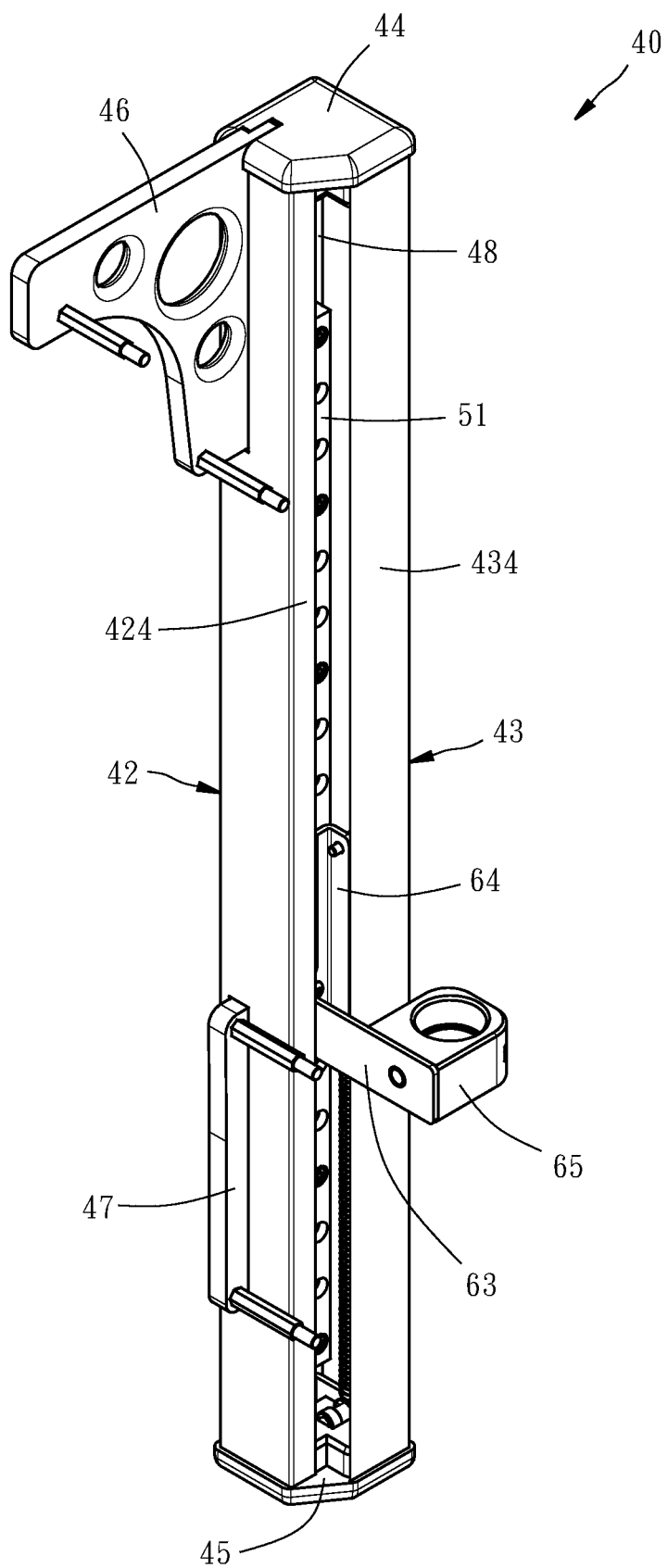
FIG. 4 is an elevational view of the wire take-up module provided by the robotic arm device of the first embodiment of the present invention.
Figure 5:
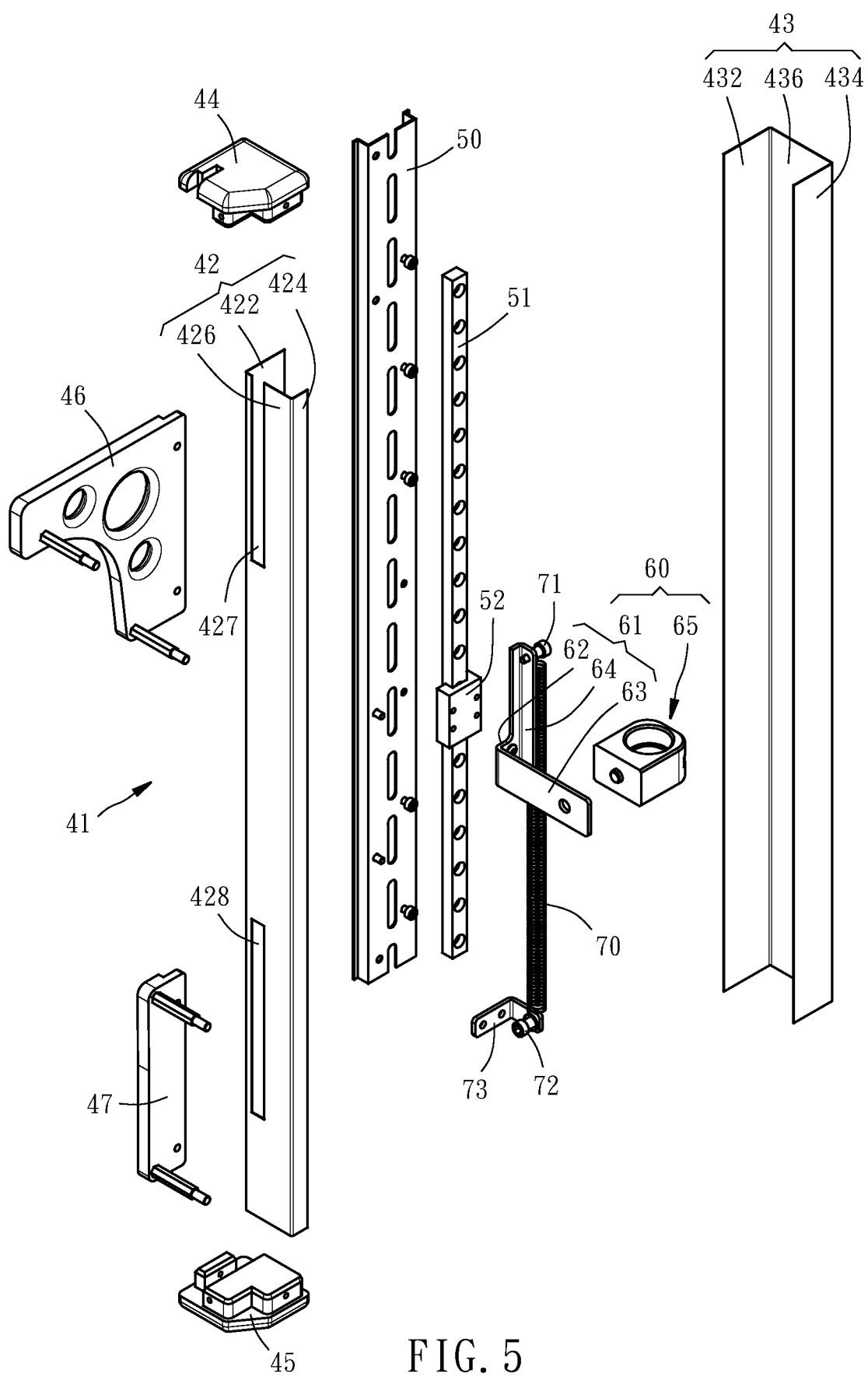
FIG. 5 is an elevational exploded view of the wire take-up module provided by the robotic arm device of the first embodiment of the present invention.

As shown in FIGS. 4 and 5, the wire take-up module 40 comprises a protective cover 41, a rail fixing seat 50, a rail 51, a sliding block 52, a conduit fixing member 60 and an elastic member 70.

Figure 3:
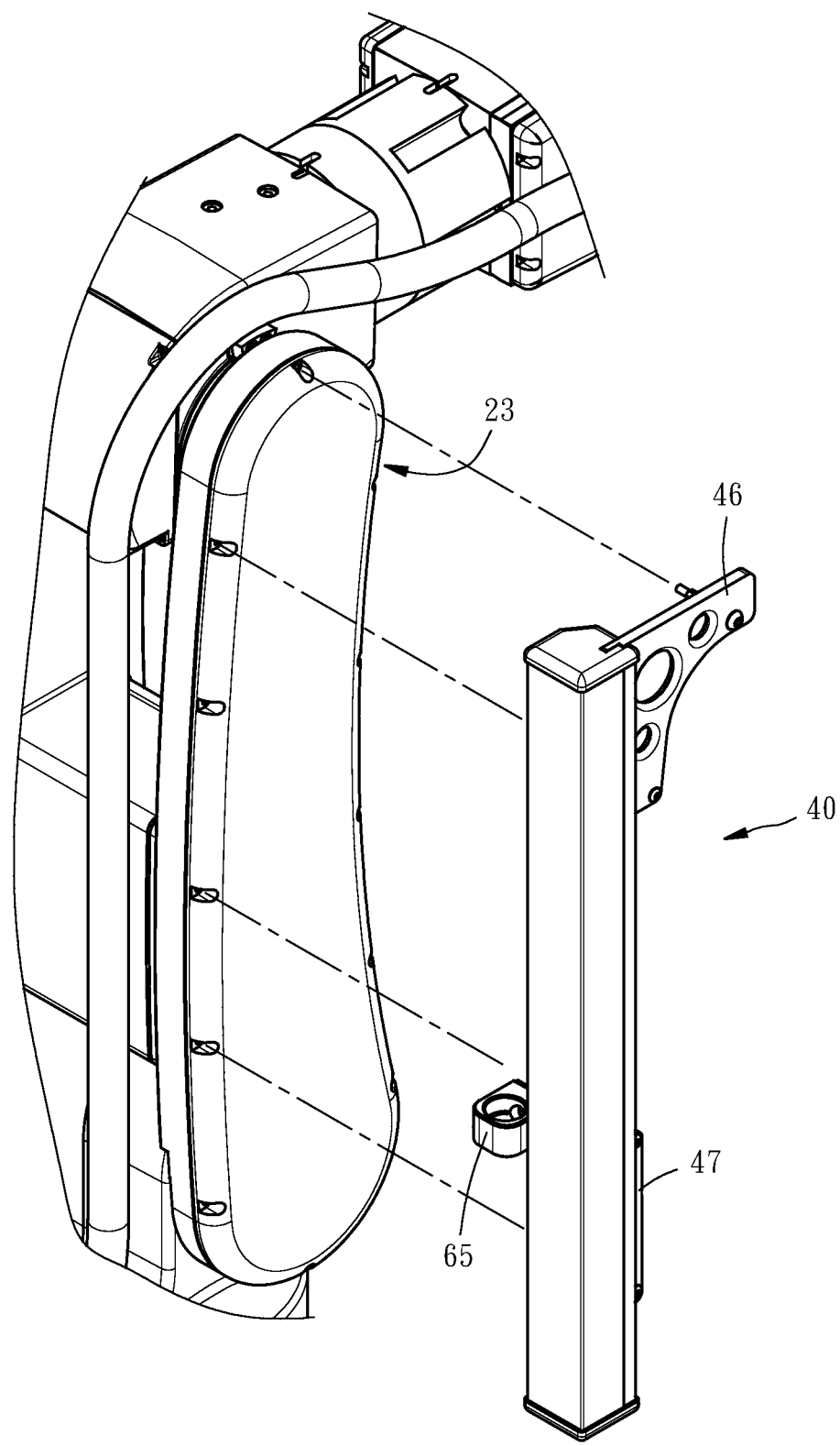
FIG. 3 is a partial elevational exploded view of the robotic arm device of the first embodiment of the present invention.

The protective cover 41 comprises a front cover 42, a rear cover 43, an upper end cover 44, a lower end cover 45, an upper support frame 46 and a lower support frame 47. The front cover 42 comprises a first side plate 422, a second side plate 424 opposite to the first side plate 422, and a first connecting plate 426 connecting the first side plate 422 and the second side plate 424. The top and bottom ends of the first connecting plate 426 respectively have an upper groove 427 and a lower groove 428. The rear cover 43 comprises a third side plate 432, a fourth side plate 434, and a second connecting plate 436 connecting the third side plate 432 and the fourth side plate 434. The third side plate 432 of the rear cover 43 is stacked on the first side plate 422 of the front cover 42 and fixed together by the rail fixing seat 50. There is a gap 48 between the fourth side plate 434 of the rear cover 43 and the second side plate 424 of the front cover 42. The upper end cover 44 is assembled on the top of the front cover 42 and the top of the rear cover 43. The lower end cover 45 is assembled at the bottom end of the front cover 42 and the bottom end of the rear cover 43. The upper support frame 46 is embedded in the upper groove 427 of the front cover 42 and fixed to the top of the rail fixing seat 50. The lower support frame 47 is embedded in the lower groove 428 of the front cover 42 and fixed to the bottom of the rail fixing seat 50. As shown in FIG. 3, the protective cover 41 uses the screw locking method to assemble the upper support frame 46 and the lower support frame 47 into the first arm 23 of the robotic arm 20.

The rail 51 is installed in the protective cover 41 and fixed to the rail fixing seat 50. The sliding block 52 is vertically slidably set on the rail 51.

The conduit fixing member 60 comprises a positioning plate 61. The positioning plate 61 comprises a first positioning portion 62, a second positioning portion 63 and a third positioning portion 64, and the second positioning portion 63 and the third positioning portion 64 are integrally and vertically connected to two opposite sides of the first positioning portion 62. As shown in FIG. 5, the positioning plate 61 is connected to the sliding block 52 with a first positioning portion 62, so that the positioning plate 61 can act in synchronization with the sliding block 52. The second positioning portion 63 of the positioning plate 61 extends out of the protective cover 41 through the gap 48. In addition, the conduit fixing member 60 comprises a ring buckle 65. On the one hand, the ring buckle 65 is connected to the second positioning portion 63 of the positioning plate 61 and is located outside the protective cover 41, and on the other hand, it buckles the wiring conduit 30 so that the ring buckle 65 can act in synchronization with the positioning plate 61 and the wiring conduit 30.

The top of the elastic member 70 (here, a tension spring is taken as an example) is fixed to a first bolt 71, and the first bolt 71 is locked on the top of the third positioning portion 64 of the positioning plate 61, and the bottom of the elastic member 70. The end is fixed to a second bolt 72, and the second bolt 72 is locked to a baffle 73. The baffle 73 is fixed to the bottom of the rail fixing seat 50. As a result, when the positioning plate 61 moves upward along the rail 51 following the sliding block 52, the elastic member 70 can be stretched by the positioning plate 61 to accumulate elastic restoring force. It is worth mentioning here that, as shown in FIG. 5, the length of the third positioning portion 64 of the positioning plate 61 is greater than the length of the sliding block 52, which can shorten the invalid stroke of the elastic member 70.

Figure 6:
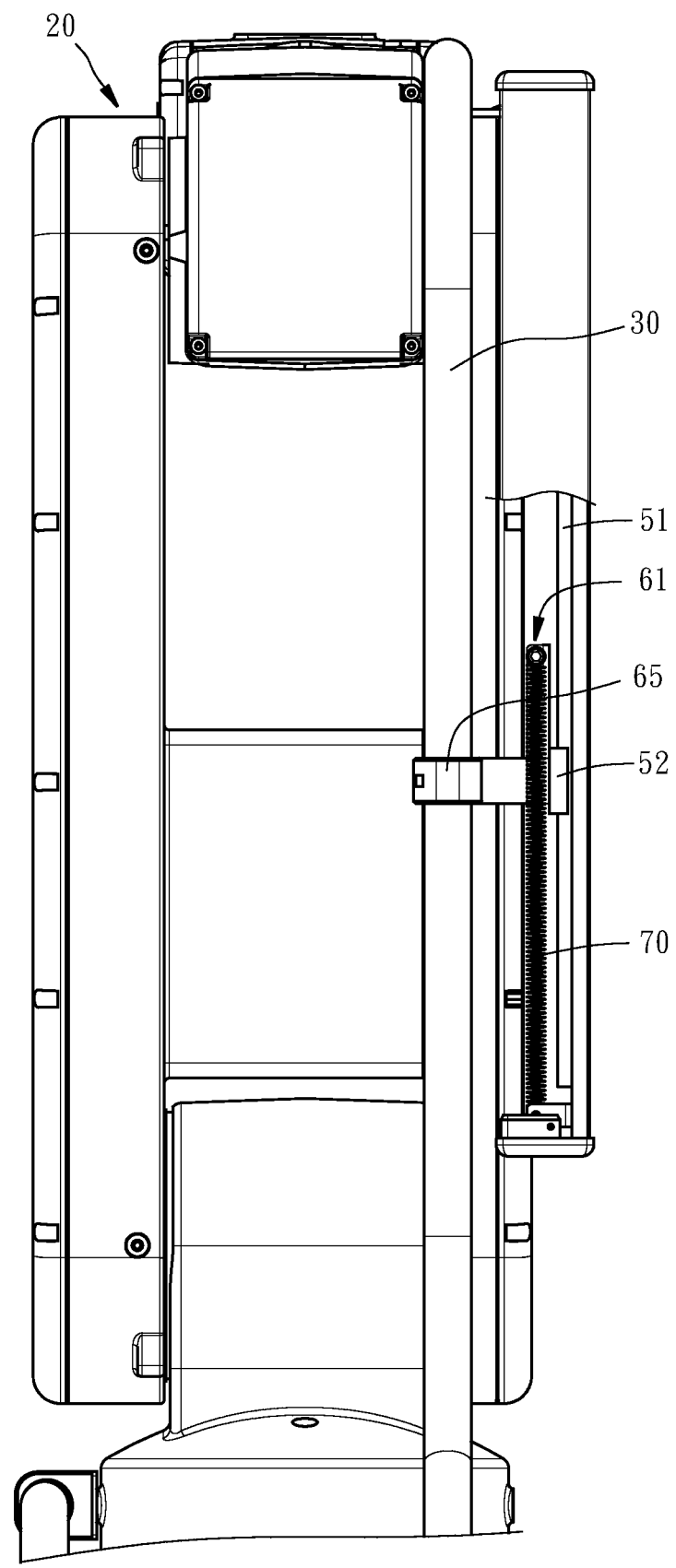
FIG. 6 is a rear partial cross-sectional view of the robotic arm device of the first embodiment of the present invention.
Figure 7:
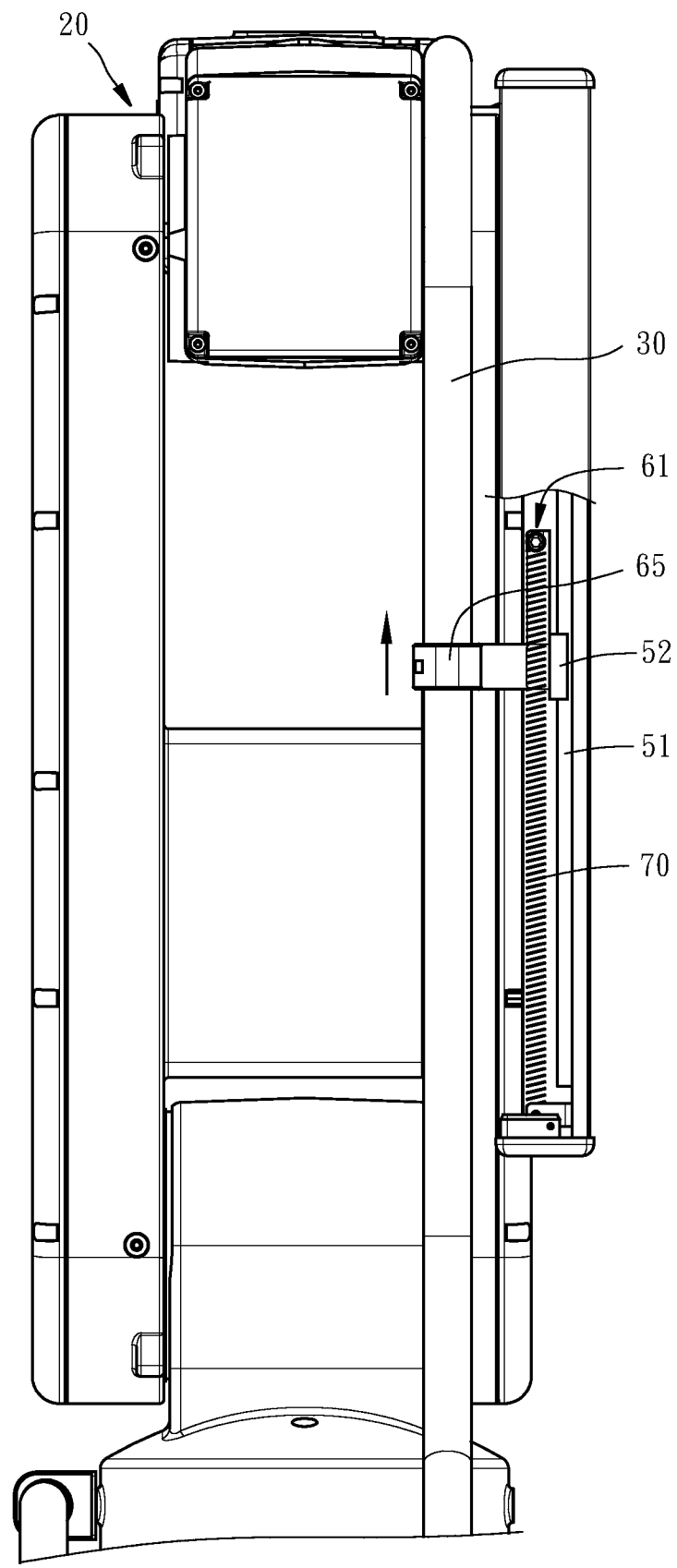
FIG. 7 is similar to FIG. 6, mainly showing the state of the sliding block moving up along the rail.

It can be seen from the above that during the action of the robotic arm 20, the wiring conduit 30 will be pulled or loosened according to the action angle of the robotic arm 20. When the wiring conduit 30 is pulled, as shown in FIGS. 6 and 7, the wiring conduit 30 drives the sliding block 52 to move up along the rail 51 through the ring buckle 65, and at the same time stretches the elastic member 70 through the positioning plate 61 to accumulate the elastic restoring force of the elastic member 70. Once the robotic arm 20 loosens the wiring conduit 30, the elastic restoring force of the elastic member 70 will move the sliding block 52 downward through the positioning plate 61, and at the same time pull the wiring conduit 30 through the ring buckle 65 to return it to its original position. Keep retracting in this way until the robotic arm 20 stops working. In the process of continuous retraction, the wiring conduit 30 will be adjacent to the first arm 23 and second arm 25 of the robotic arm 20, which not only prevents the wiring conduit 30 from interfering with the surrounding objects, but also saves the operating space of the robotic arm 20.

Figure 8:
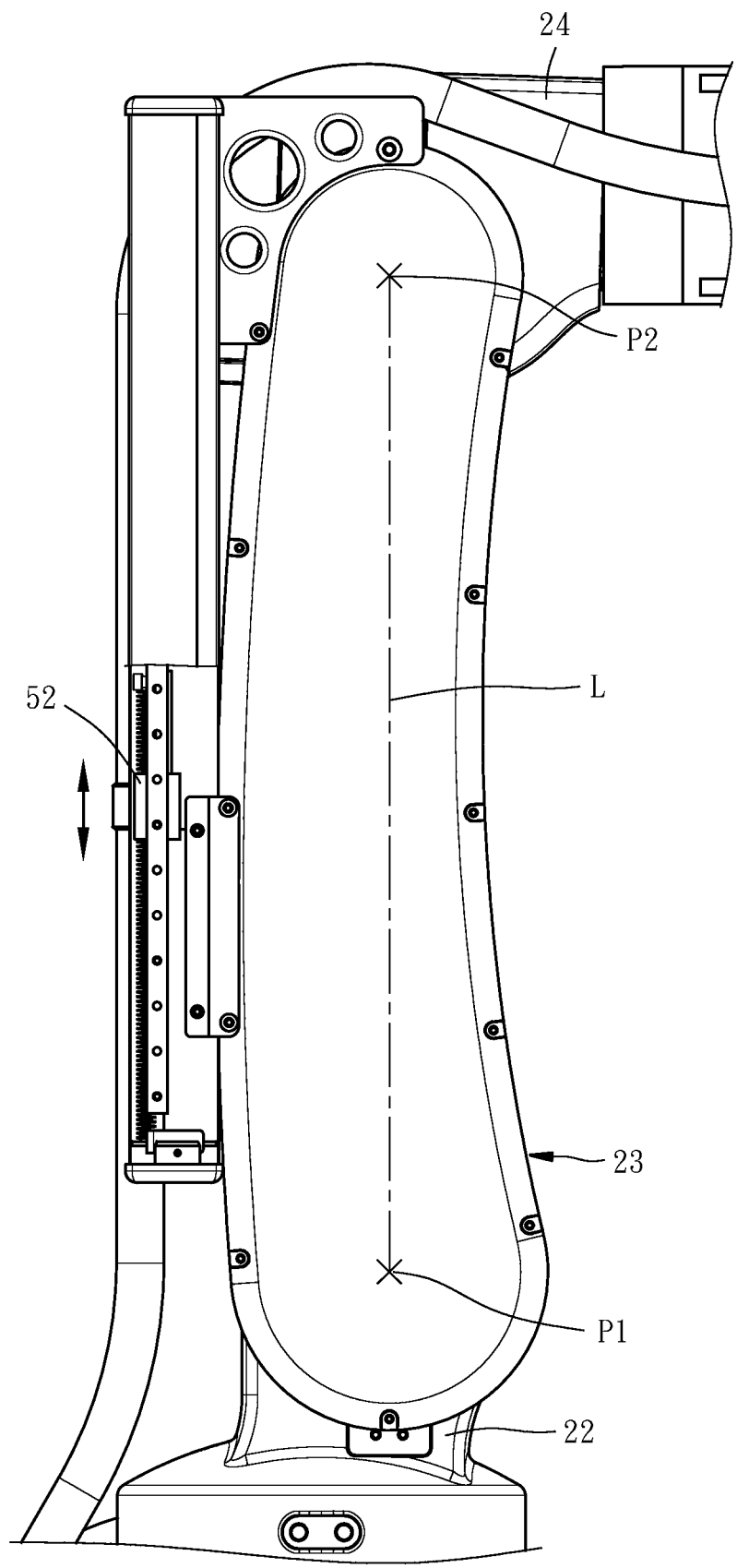
FIG. 8 is a side partial cross-sectional view of the robotic arm device of the first embodiment of the present invention.

In addition, it needs to be supplemented that, as shown in FIG. 8, the bottom end of the first arm 23 pivots around a first rotation center P1 relative to the first joint seat 22, and the second joint seat 24 pivots around a second rotation center P2 relative to the first arm 23. The line L formed by the shortest distance between the first rotation center P1 and the second rotation center P2 is parallel to the motion trajectory of the sliding block 52, so that the sliding block 52 can operate stably and achieve the effect of the line arrangement during the operation. Secondly, since the wiring conduit 30 will be stretched according to the operating angle of the robotic arm 20, once the wiring conduit 30 is stretched, the sliding block 52 will move upward along the rail 51. In other words, the stroke of the sliding block 52 will depend on the length of the wiring conduit 30 being stretched. In this embodiment, the stroke of the sliding block 52 is between 320 mm-400 mm, so that it can correspond to the maximum stretched length of the wiring conduit 30. The maximum stretched length of the wiring conduit usually occurs when the second arm 25 is rotated 90 degrees, the third joint seat 26 is rotated 120 degrees, and the end connecting seat 27 is rotated 360 degrees. In addition, the tensile force of the elastic member 70 is between 0.8 kg-1.3 kg in this embodiment. If it is less than 0.8 kg, when the robotic arm 20 moves quickly, the recycling of the wiring conduit 30 will not be fast enough, which will affect the subsequent retracting. If it is higher than 1.3 kg, it is easy to cause the load of the motor to rise, resulting in damage to the wiring conduit 30 and the cable inside.

Figure 9:
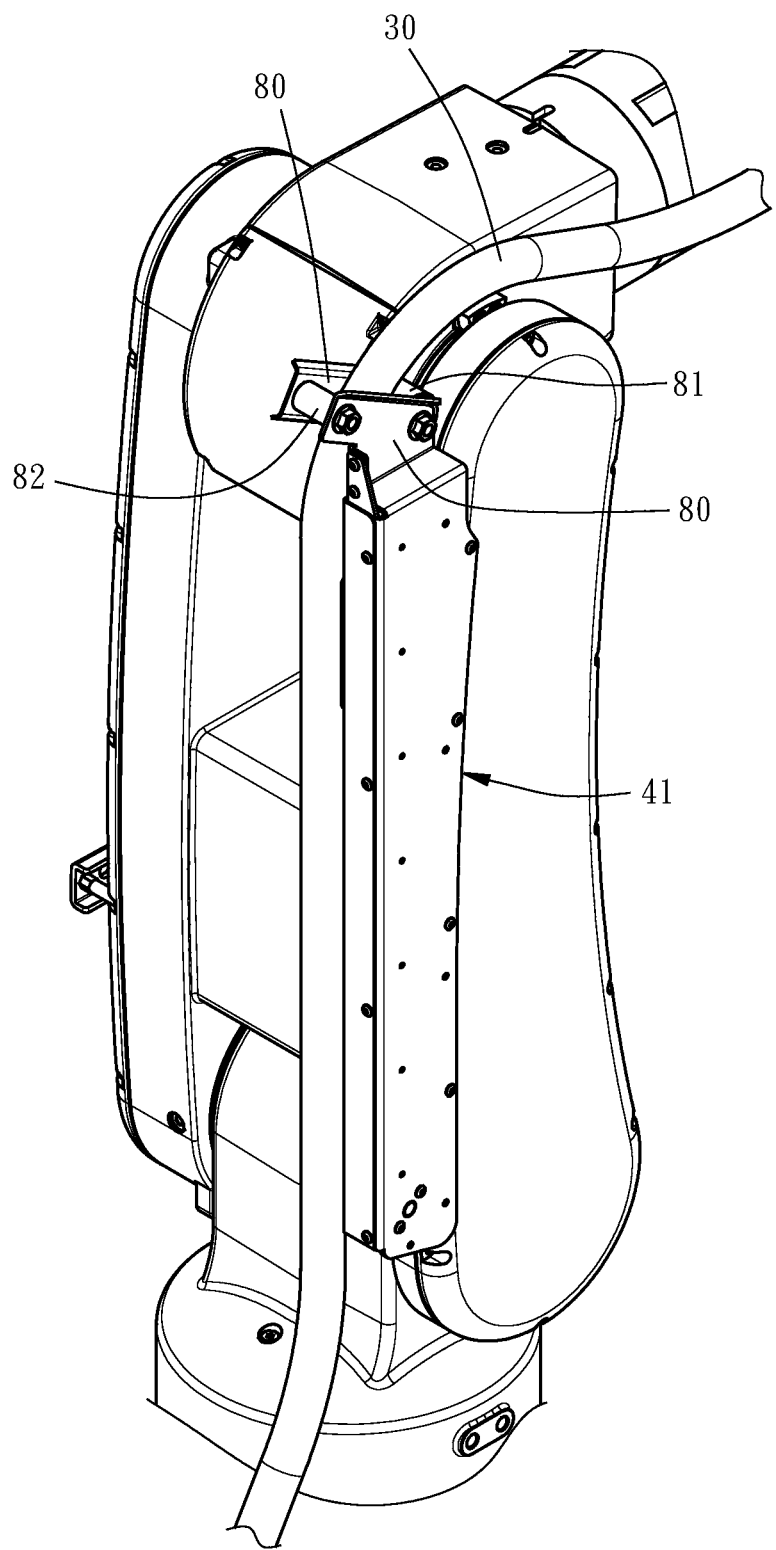
FIG. 9 is an oblique top elevational view of a robotic arm device in accordance with a second embodiment of the present invention.
Figure 10:
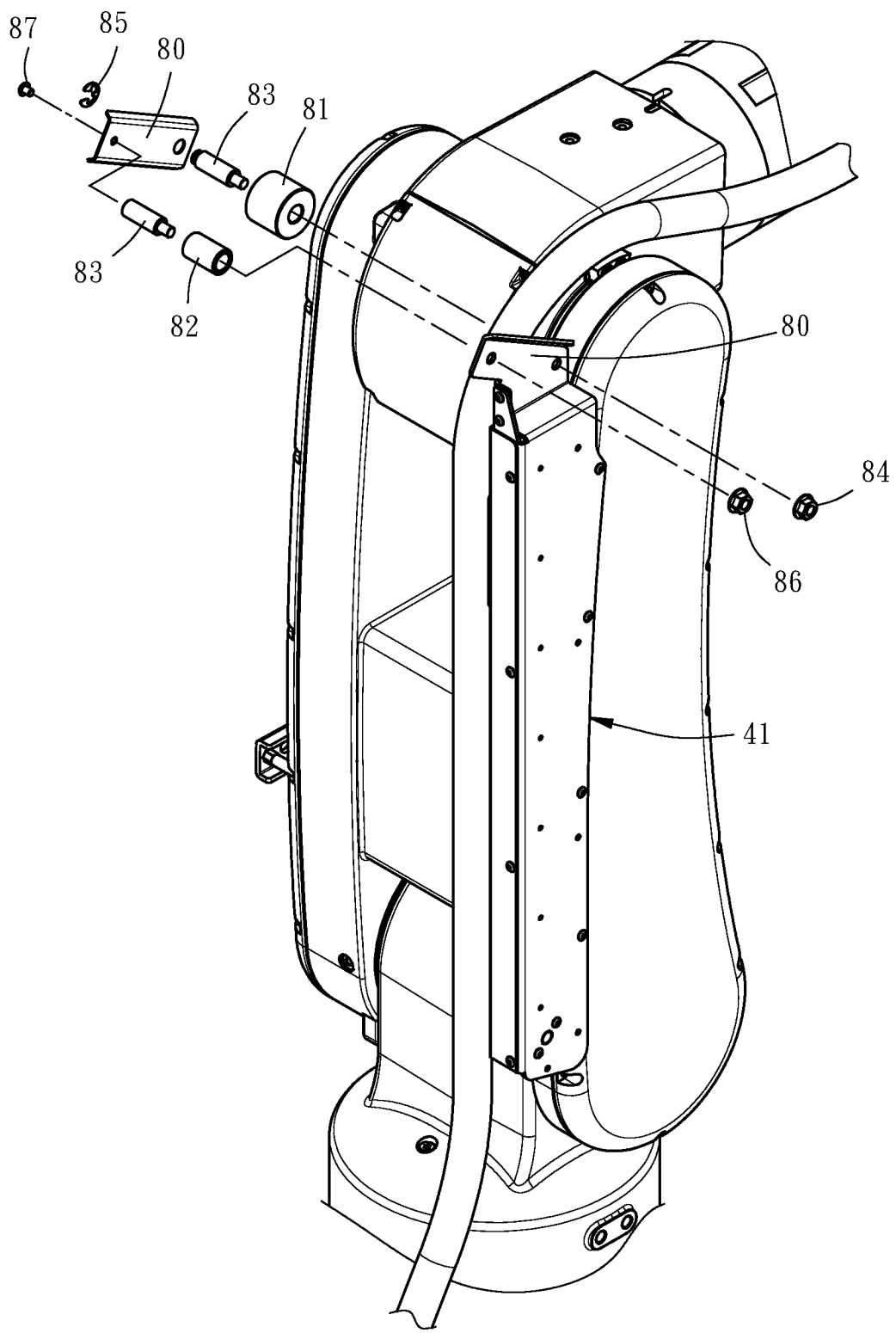
FIG. 10 is a partial elevational exploded view of the robotic arm device of the second embodiment of the present invention.

Please continue to refer to FIGS. 9 and 10, the second embodiment of the present invention further provides two baffles 80 and two guide wheels 81, 82. One of the baffles 80 is fixed on the top of the protective cover 41. Each guide wheel 81, 82 is pivoted between the two baffles 80 with a wheel shaft 83 respectively. The two ends of one wheel shaft 83 are fixed with a nut 84 and a C-shaped buckle 85 respectively, and the two ends of the other wheel shaft 83 are fixed with a nut 86 and a screw 87 respectively. In this way, the wiring conduit 30 is allowed to pass between the two guide wheels 81 and 82. On the one hand, the wiring conduit 30 is provided with guiding and limiting effects. On the other hand, by disassembling the guide wheels 82, the wiring conduit 30 and its internal cable can be easily repaired and replaced.

Figure 11:
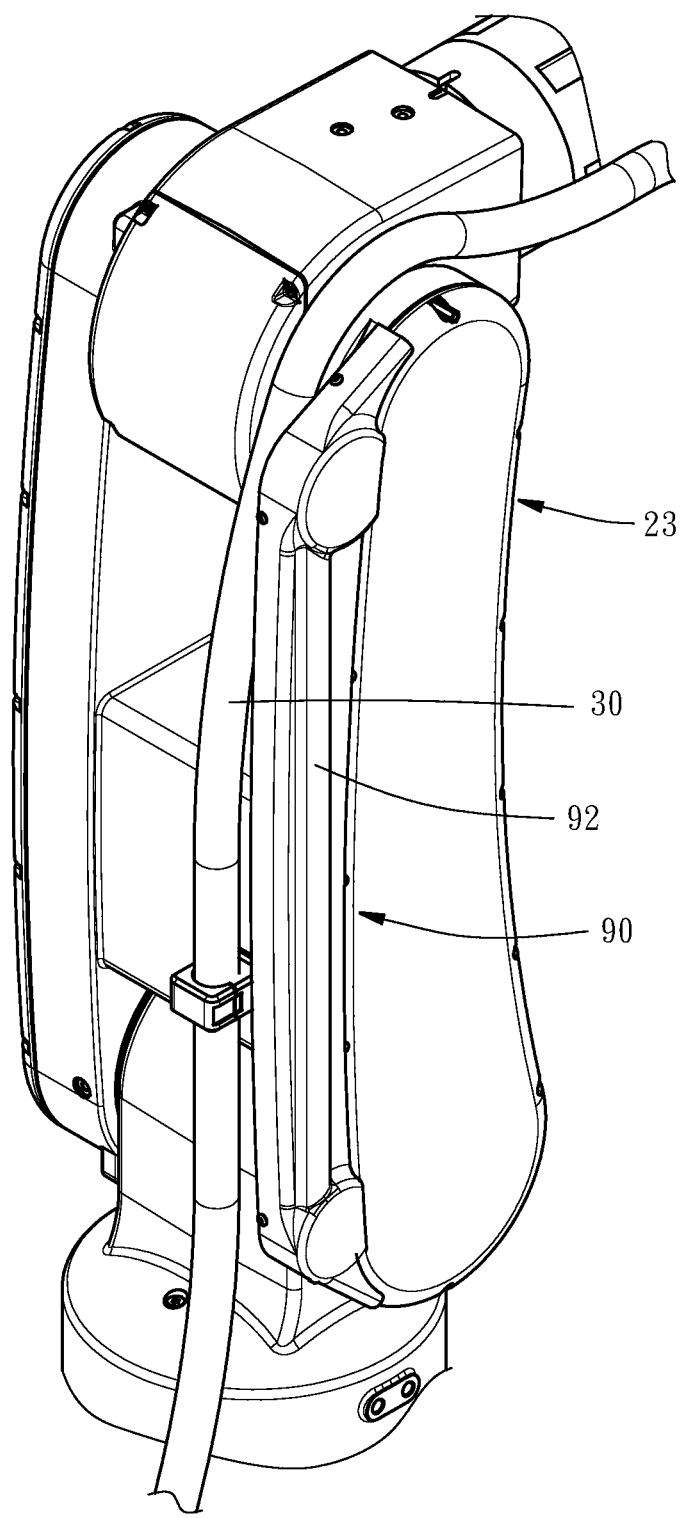
FIG. 11 is an oblique top elevational view of a robotic arm device in accordance with a third embodiment of the present invention.
Figure 12:
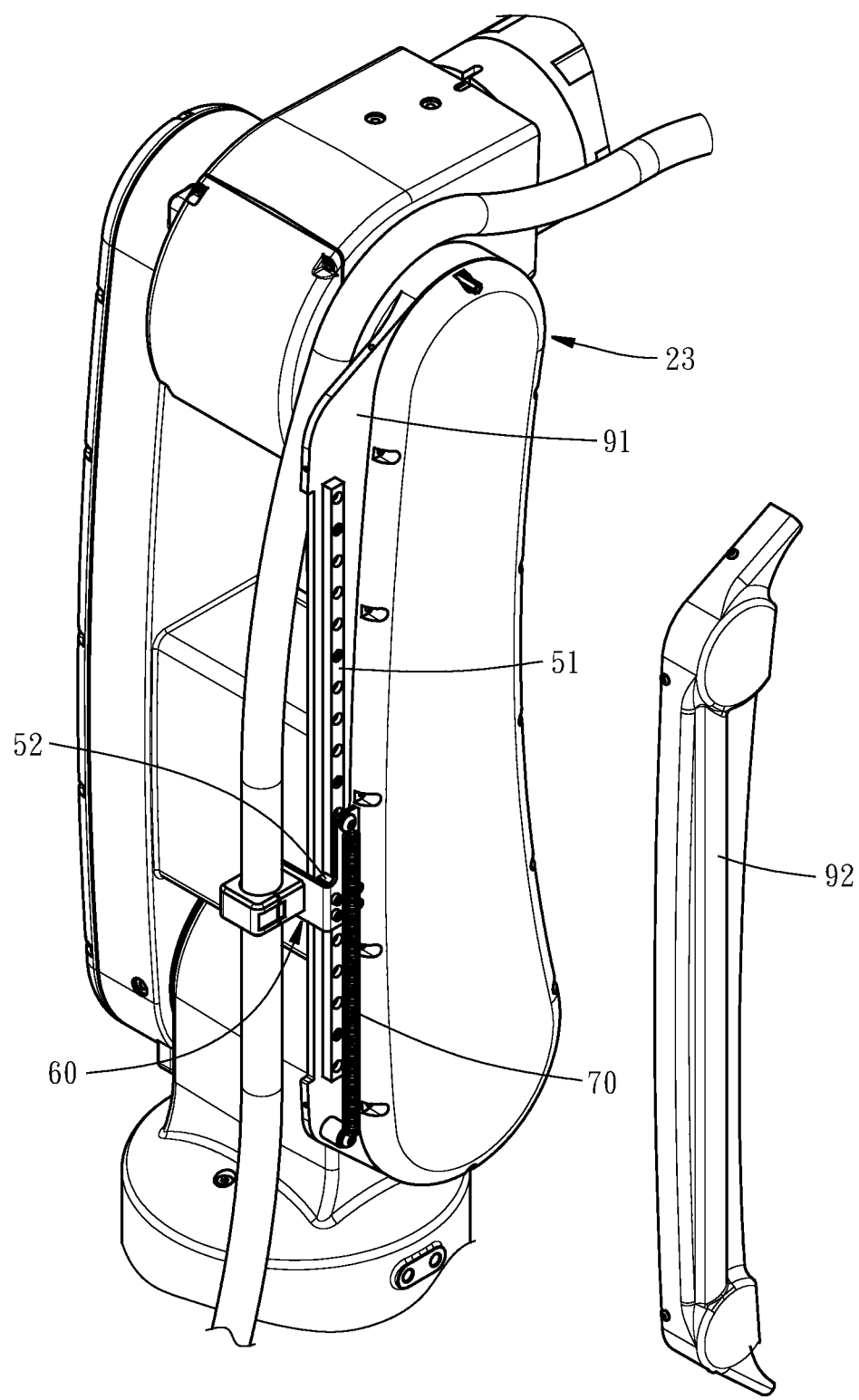
FIG. 12 is a partial elevational exploded view of the robotic arm device of the third embodiment of the present invention.

Please refer to FIGS. 11 and 12. The wire take-up module 90 provided by the third embodiment of the present invention is roughly the same as the above-mentioned first embodiment. The main difference is that the wire take-up module 40 provided by the first embodiment is plugged into the first arm 23 in a modular way, as for the third embodiment, the rail fixing seat 91 is integrally formed on the first arm 23, and the protective cover 92 is installed on the first arm 23 by screw locking and covers the rail fixing seat 91, which can further improve the structural strength. As for the other components of the wire take-up module 90 (such as the rail 51, the sliding block 52, the conduit fixing member 60, and the elastic member 70) are the same as the first embodiment described above, and the structural relationships and operating principles are not repeated here.

In summary, the robotic arm device 10 of the present invention uses the wire take-up function provided by the wire take-up modules 40, 90 to make the wire set (wiring conduit 30) as close as possible to the outer surface of the robotic arm 20 when it is stretched or loosened. In addition to making the overall structure more concise, it can also prevent the wire set (wiring conduit 30) from interfering with surrounding objects and save the space required by the robotic arm 20 during operation, thereby improving the convenience of wiring.

What is claimed is:

1. A robotic arm device, comprising:
   a robotic arm comprising a base, a first arm and a second arm;
   a wire set adjacent to said first arm of said robotic arm and said second arm of said robotic arm, said wire set having one end thereof fixed to said second arm of said robotic arm; and
   a wire take-up module located in said first arm of said robotic arm, said wire take-up module comprising a rail, a sliding block and an elastic member, said sliding block being vertically movably set on said rail and connected with said wire set and said elastic member;
   wherein said robotic arm also comprises a first joint seat and a second joint seat, said first joint seat being pivoted on a top side of said base, said first arm having a bottom end thereof pivoted to said first joint seat, said second joint seat being pivoted on an opposing top end of said first arm, said second arm having a rear end thereof pivoted to said second joint seat;
   wherein the bottom end of said first arm pivots around a first rotation center relative to said first joint seat; said second joint seat is pivoted around a second rotation center relative to said first arm; the line formed by the shortest distance between said first rotation center and said second rotation center is parallel to the motion trajectory of said sliding block;
   wherein said wire set comprises a cable and a wiring conduit covering said cable, said wiring conduit having one end thereof fixed to said base of said robotic arm and an opposite end thereof fixed to an opposing front end of said second arm of said robotic arm;
   wherein said wire take-up module further comprises a protective cover and a conduit fixing member, said protective cover being set on said first arm of said robotic arm, said rail being set in said protective cover, said conduit fixing member connecting said sliding block and said wiring conduit, said elastic member having opposing top and bottom ends thereof fixed to said conduit fixing member and said protective cover respectively;
   wherein said conduit fixing member comprises a positioning plate and a ring buckle, said positioning plate connecting a top end of said sliding block and the top end of said elastic member, said ring buckle being set on said positioning plate to fix said wiring conduit;
   wherein said positioning plate comprises a first positioning portion, a second positioning portion and a third positioning portion, said second positioning portion and said third positioning portion being vertically connected to two opposite sides of said first positioning portion, said first positioning portion connecting said sliding block, said second positioning portion connecting said ring buckle, said third positioning portion being connected to the top end of said elastic member, the length of said third positioning portion being greater than the length of said sliding block.

2. The robotic arm device as claimed in claim 1, wherein one end of said wiring conduit is set in a rotatable conduit fixation head, said conduit fixation head being fixed in a holder, said holder being connected to an end connecting seat, said end connecting seat being pivoted to a third joint seat, said third joint seat being pivoted to the front end of said second arm.

3. The robotic arm device as claimed in claim 1, wherein said rail is fixed to a rail fixing seat, and said rail fixing seat is fixed to said protective cover.

4. The robotic arm device as claimed in claim 1, wherein said wire take-up module further comprises two baffles and two guide wheels, one said baffle being fixed on a top end of said protective cover, said guide wheels being detachably pivoted between said two baffles and allowing said wiring conduit to pass between said two guide wheels.

* * * * *